United States Patent
Li et al.

(10) Patent No.: US 10,795,838 B2
(45) Date of Patent: Oct. 6, 2020

(54) USING TRANSFER BUFFER TO HANDLE HOST READ COLLISIONS IN SSD

(71) Applicant: Intel Corporation, Santa Clara, CA (US)

(72) Inventors: Peng Li, Beaverton, OR (US); David J. Pelster, Longmont, CO (US); William Harper, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/242,471

(22) Filed: Jan. 8, 2019

(65) Prior Publication Data

US 2019/0138468 A1    May 9, 2019

(51) Int. Cl.
G06F 13/16    (2006.01)
G06F 3/06     (2006.01)
G06F 12/06    (2006.01)

(52) U.S. Cl.
CPC ........ *G06F 13/1673* (2013.01); *G06F 3/0604* (2013.01); *G06F 3/0656* (2013.01); *G06F 3/0679* (2013.01); *G06F 12/06* (2013.01)

(58) Field of Classification Search
None
See application file for complete search history.

(56) References Cited

U.S. PATENT DOCUMENTS 6,504,204 B1 *  1/2003  Hsu ............... G11C 11/405
                                           257/306
2018/0018101 A1 *  1/2018  Benisty ............ G06F 3/0608

* cited by examiner

*Primary Examiner* — Idriss N Alrobaye
*Assistant Examiner* — Dayton Lewis-Taylor
(74) *Attorney, Agent, or Firm* — Jordan IP Law, LLC (57) ABSTRACT

An embodiment of a semiconductor apparatus may include technology to detect a collision for a read request of an electronic storage device, and read data for the read request directly from a transfer buffer if the collision is detected. Other embodiments are disclosed and claimed.

17 Claims, 8 Drawing Sheets

USING TRANSFER BUFFER TO HANDLE HOST READ COLLISIONS IN SSD

TECHNICAL FIELD

Embodiments generally relate to storage systems. More particularly, embodiments relate to using a transfer buffer to handle host read collisions in a solid state drive (SSD).

BACKGROUND

A persistent storage device, such as a SSD, may include media such as NAND memory. A logical-to-physical (L2P) table may provide a translation between logical and physical addresses. Some SSDs may have limited endurance. For example, NAND memory may only be written a finite number of times, and the SSD may wear out as the SSD ages. The Non-Volatile Memory EXPRESS (NVMe) 1.3 specification (nvmexpress.org) may define and/or support various technologies to address various endurance issues.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Various embodiments described herein may include a memory component and/or an interface to a memory component. Such memory components may include volatile and/or nonvolatile (NV) memory (NVM). Volatile memory may be a storage medium that requires power to maintain the state of data stored by the medium. Non-limiting examples of volatile memory may include various types of random access memory (RAM), such as dynamic RAM (DRAM) or static RAM (SRAM). One particular type of DRAM that may be used in a memory module is synchronous dynamic RAM (SDRAM). In particular embodiments, DRAM of a memory component may comply with a standard promulgated by Joint Electron Device Engineering Council (JEDEC), such as JESD79F for double data rate (DDR) SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

NVM may be a storage medium that does not require power to maintain the state of data stored by the medium. In one embodiment, the memory device may include a block addressable memory device, such as those based on NAND or NOR technologies. A memory device may also include future generation nonvolatile devices, such as a three dimensional (3D) crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor RAM (FeTRAM), anti-ferroelectric memory, magnetoresistive RAM (MRAM) memory that incorporates memristor technology, resistive memory including the metal oxide base, the oxygen vacancy base and the conductive bridge RAM (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The memory device may refer to the die itself and/or to a packaged memory product. In particular embodiments, a memory component with non-volatile memory may comply with one or more standards promulgated by the JEDEC, such as JESD218, JESD219, JESD220-1, JESD223B, JESD223-1, or other suitable standard (the JEDEC standards cited herein are available at jedec.org).

Figure 1:
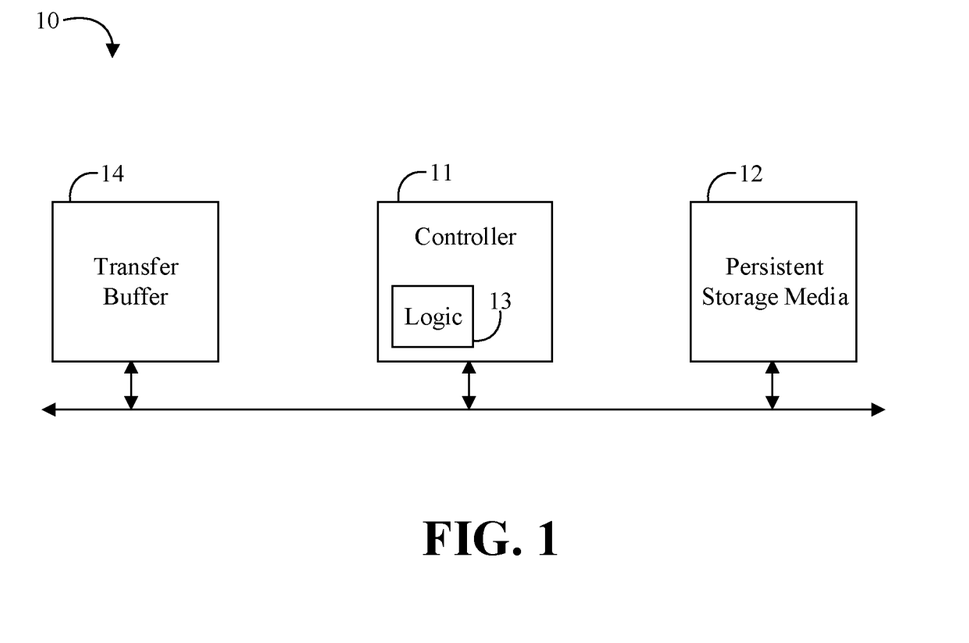
FIG. 1 is a block diagram of an example of an electronic processing system according to an embodiment.

Turning now to FIG. 1, an embodiment of an electronic storage system 10 may include a persistent storage media 12, a transfer buffer 14, and a controller 11 communicatively coupled to the persistent storage media 12 and the transfer buffer 14. For example, the transfer buffer 14 may include SRAM inside the controller 11. The controller 11 may include logic 13 to detect a collision for a read request, and read data for the read request directly from the transfer buffer 14 if the collision is detected. For example, the logic 13 may be configured to detect the collision based on an exception flag in a L2P table entry which corresponds to the read request. The logic 13 may also be configured to determine an address to read from the transfer buffer 14 based on the L2P table entry if the exception flag is set to represent an exception condition. In some embodiments, the logic 13 may be further configured to increase a reference count for a cache slot indicated in the L2P table entry. In some embodiments, the logic 13 may also be configured to detect an exception condition for a write request, write data for the write request to a write address of the transfer buffer 14, set an exception flag in a L2P table entry which corresponds to the write request to indicate the exception condition and update the L2P table entry to point to the write address of the transfer buffer 14.

In any of the embodiments herein, the persistent storage media 12 may include NAND media. For example, the logic 13 may also be configured to write data from the transfer buffer 14 to a write address of NAND media, set an exception flag in a L2P table entry which corresponds to the data to indicate a non-exception condition, and update the L2P table entry to point to the write address of the NAND media. In some embodiments, the logic 13 and/or the transfer buffer may be located in, or co-located with, various components, including the controller 11 (e.g., on a same die).

Embodiments of each of the above controller 11, persistent storage media 12, logic 13, transfer buffer 14, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof. Embodiments of the controller 11 may include a general purpose controller, a special purpose controller, a memory controller, a storage controller, a micro-controller, a processor, a central processor unit (CPU), etc.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the transfer buffer 14, persistent storage media 12, or other system memory may store a set of instructions which when executed by the controller 11 cause the system 10 to implement one or more components, features, or aspects of the system 10 (e.g., the logic 13, detecting a collision for a read request, reading data for the read request directly from the transfer buffer 14 if the collision is detected, etc.).

Figure 2:
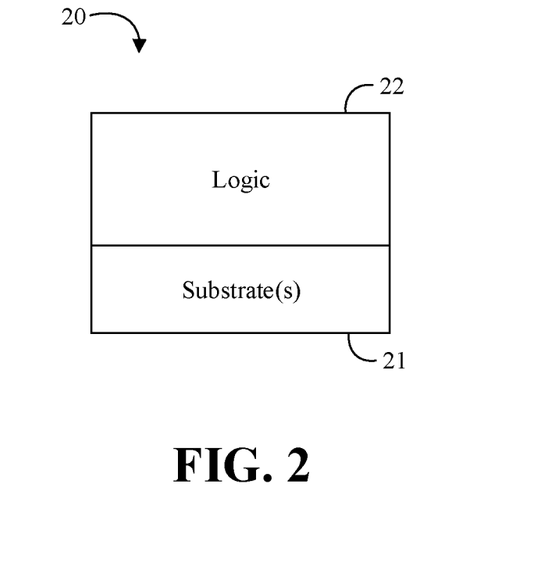
FIG. 2 is a block diagram of an example of a semiconductor apparatus according to an embodiment.

Turning now to FIG. 2, an embodiment of a semiconductor apparatus 20 for use with an electronic storage device may include one or more substrates 21, and logic 22 coupled to the one or more substrates 21, wherein the logic 22 is at least partly implemented in one or more of configurable logic and fixed-functionality hardware logic. The logic 22 coupled to the one or more substrates 21 may be configured to detect a collision for a read request of an electronic storage device, and read data for the read request directly from a transfer buffer if the collision is detected. For example, the logic 22 may be configured to detect the collision based on an exception flag in a L2P table entry which corresponds to the read request. The logic 22 may also be configured to determine an address to read from the transfer buffer based on the L2P table entry if the exception flag is set to represent an exception condition. In some embodiments, the logic 22 may be further configured to increase a reference count for a cache slot indicated in the L2P table entry. The logic 22 may also be configured to detect an exception condition for a write request of an electronic storage device, write data for the write request to a write address of the transfer buffer, set an exception flag in a L2P table entry which corresponds to the write request to indicate the exception condition, and update the L2P table entry to point to the write address of the transfer buffer.

In any of the embodiments herein, the electronic storage device may include NAND media. For example, the logic 22 may be further configured to write data from the transfer buffer to a write address of NAND media of the electronic storage device, set an exception flag in a L2P table entry which corresponds to the data to indicate a non-exception condition, and update the L2P table entry to point to the write address of the NAND media. In some embodiments, the logic 22 coupled to the one or more substrates 21 may include transistor channel regions that are positioned within the one or more substrates 21.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

The apparatus 20 may implement one or more aspects of the method 25 (FIGS. 3A to 3C), the method 40 (FIG. 4), the method 50 (FIG. 5), the method 62 (FIG. 6), or any of the embodiments discussed herein. In some embodiments, the illustrated apparatus 20 may include the one or more substrates 21 (e.g., silicon, sapphire, gallium arsenide) and the logic 22 (e.g., transistor array and other integrated circuit/IC components) coupled to the substrate(s) 21. The logic 22 may be implemented at least partly in configurable logic or fixed-functionality logic hardware. In one example, the logic 22 may include transistor channel regions that are positioned (e.g., embedded) within the substrate(s) 21. Thus, the interface between the logic 22 and the substrate(s) 21 may not be an abrupt junction. The logic 22 may also be considered to include an epitaxial layer that is grown on an initial wafer of the substrate(s) 21.

Figure 3A:
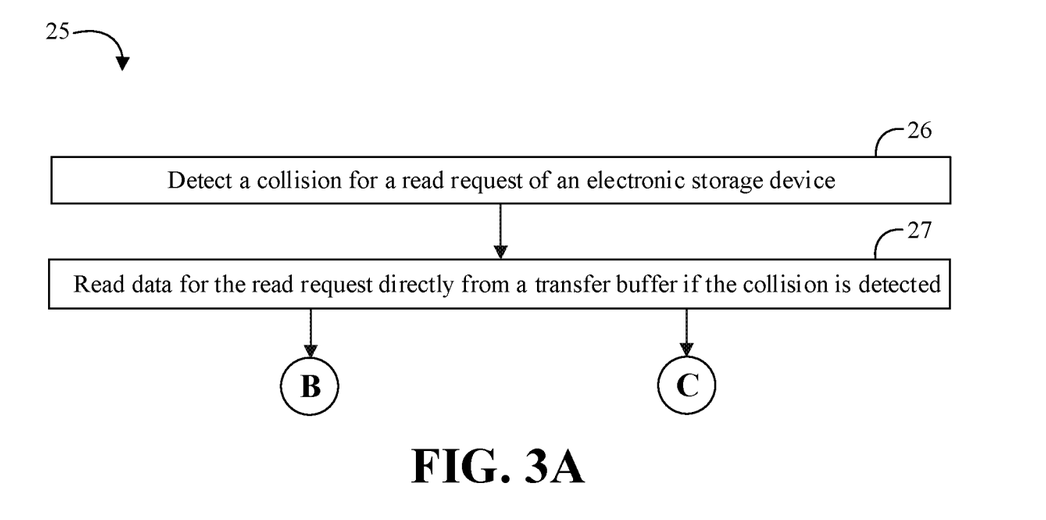
FIGS. 3A to 3C are flowcharts of an example of a method of controlling storage according to an embodiment.
Figure 3B:
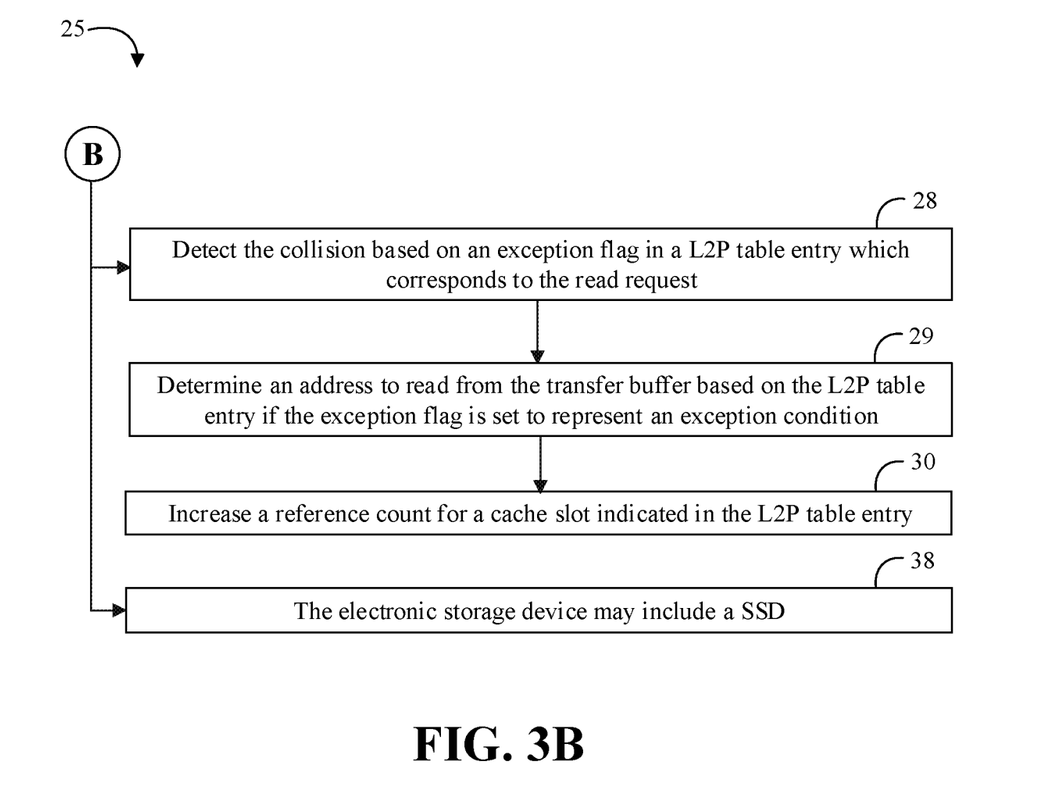
Figure 3C:
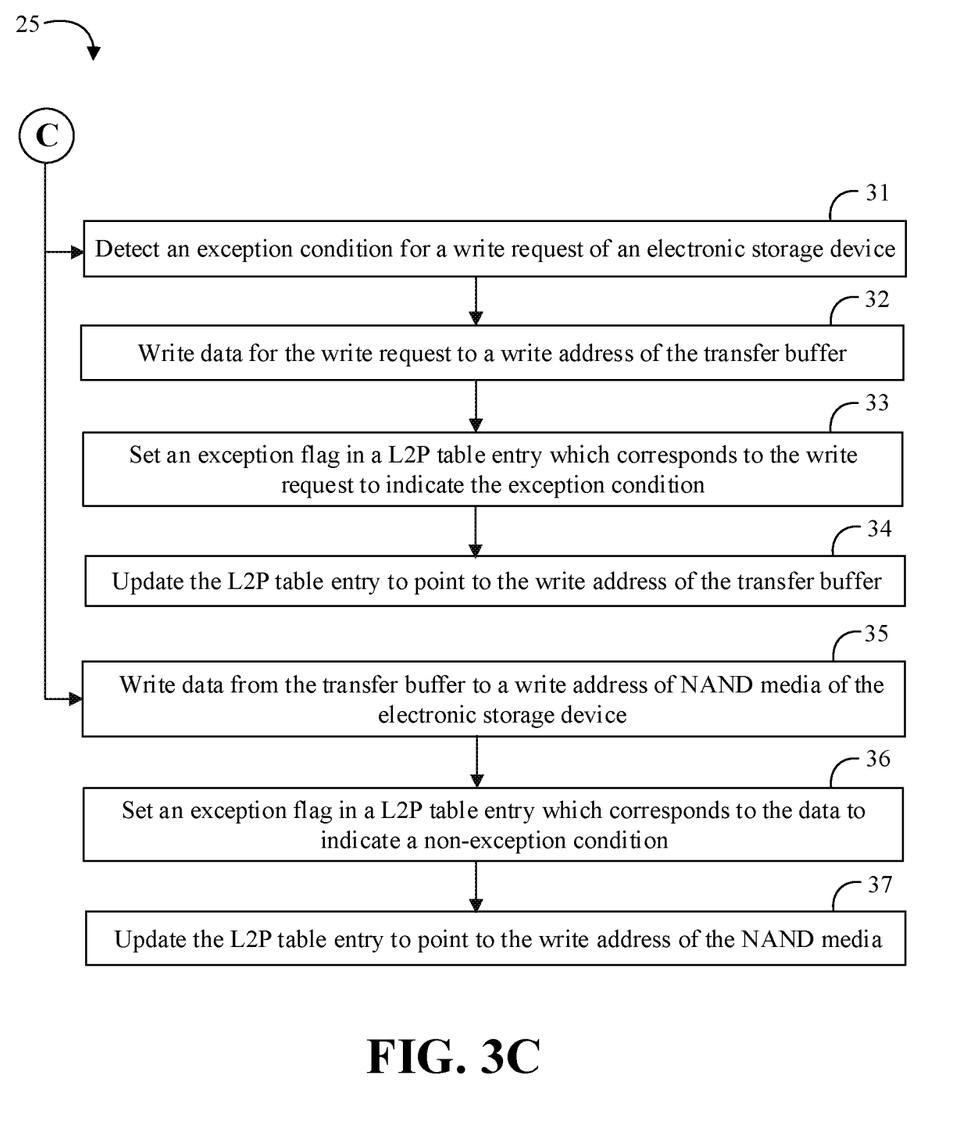

Turning now to FIGS. 3A to 3C, an embodiment of a method 25 of controlling storage may include detecting a collision for a read request of an electronic storage device at block 26, and reading data for the read request directly from a transfer buffer if the collision is detected at block 27. For example, the method 25 may include detecting the collision based on an exception flag in a L2P table entry which corresponds to the read request at block 28. The method 25 may also include determining an address to read from the transfer buffer based on the L2P table entry if the exception flag is set to represent an exception condition at block 29. Some embodiments of the method 25 may further include increasing a reference count for a cache slot indicated in the L2P table entry at block 30. The method 25 may also include detecting an exception condition for a write request of an electronic storage device at block 31, writing data for the write request to a write address of the transfer buffer at block 32, setting an exception flag in a L2P table entry which corresponds to the write request to indicate the exception condition at block 33, and updating the L2P table entry to point to the write address of the transfer buffer at block 34. Some embodiments of the method 25 may further include writing data from the transfer buffer to a write address of NAND media of the electronic storage device at block 35, setting an exception flag in a L2P table entry which corresponds to the data to indicate a non-exception condition at block 36, and updating the L2P table entry to point to the write address of the NAND media at block 37. In any of the embodiments herein, the electronic storage device may include a SSD at block 38.

Embodiments of the method 25 may be implemented in a system, apparatus, computer, device, etc., for example, such as those described herein. More particularly, hardware implementations of the method 25 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 25 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 25 may be implemented on a computer readable medium as described in connection with Examples 21 to 27 below. Embodiments or portions of the method 25 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Some embodiments may advantageously provide technology to avoid collision for host reads by using a L2P table to track transfer buffer (TBUF) addresses. For host reads, a collision check is required because the data to be read can be in the TBUF instead of the NAND media. In this scenario, some other SSD firmware will flush the data to NAND first, and then read it back (from NAND) to the host. This approach can impact read quality-of-service (QoS) by introducing at least one NAND programing time.

Some SSD firmware may use an exception bit in an L2P entry to indicate if the corresponding indirection unit (IU) has collision. The remaining bits of the L2P entry represent the NAND physical address of the IU. If the exception bit is set, the address may be invalid. For a host read, the firmware will first check the exception bit. If it is set, some other SSD firmware will flush all the TBUF write data (either host writes or defrag writes) to NAND media, and will not return the data (from NAND) to host until the exception bit is clear.

When the exception bit is set, some embodiments may advantageously use the remaining bits in the L2P entry to represent the TBUF address. After a collision is detected, some embodiments may advantageously read the data from the TBUF directly. Some embodiments may also add a reference count for each cache slot in the TBUF. The cache slot may not be freed until its reference count reaches zero (0). Advantageously, some embodiments may improve the host read QoS by at least one NAND programing time. Some embodiments may also advantageously reduce the amount of data written to NAND (e.g., when flushing write data to NAND, padding NAND pages maybe required).

Without being limited to particular implementations, some embodiments may provide a L2P entry data structure as represented in the following pseudo-code:

```
/*
* Example L2P table entry data structure to locate
* an indirection unit on the NAND array or TBUF.
*/
typedef union
{
    struct physicalNandAddress
    {
        ///< Collision flag
        uint64_t exception         : NUM_EXCEP_BITS;
        ///< Erase Block (EB)
        uint64_t EB                : NAND_ADDR_NUM_EB_BITS;
        ///< NAND Page/Stripe
        uint64_t pg                : NAND_ADDR_NUM_PG_BITS;
        ///< Logical Die in Band
        uint64_t die               : NAND_ADDR_NUM_DIE_BITS;
        ///< IU offset in the NAND page
        uint64_t off               : NAND_ADDR_NUM_OFFSET_BITS;
        ///< Reserved bits for extension
        uint64_t rsvd              : NUM_RSVD_BITS;
    } bits;
    struct physicalTbufAddress
    {
        ///< Collision flag
        uint64_t exception         : NUM_EXCEP_BITS;
        ///< TBUF offset physical address
        uint64_t TbufAdd           : TBUF_ADDR_NUM_BITS;
        ///< Cache slot ID for this IU
        uint64_t csId              : TBUF_CDID_NUM_BITS;
        ///< Reserved bits for extension
        uint64_t rsvd              : NUM_RSVD_BITS;
```

```
    } bits;
    uint64_t value;
} l2pEntry_t;
```

Based on the above definition of the L2P entry data structure, if the exception bit is set to 1 (e.g., representing a non-exception condition), the remaining bits represent the physical NAND address. Otherwise, the remaining bits represent the TBUF address. Those skilled in the art will appreciate that the data structure shown above is just one example of accomplishing a suitable L2P entry data structure. Another example may add the address to a linear map of the L2P table, for example a physical indirection type of packed indirection address. Still another example may be to overload the next die address and utilize the erase block (EB) or page address to contain the local address of the data. Given the benefit of the present specification and figures, numerous other examples may occur to those skilled in the art.

Figure 4:
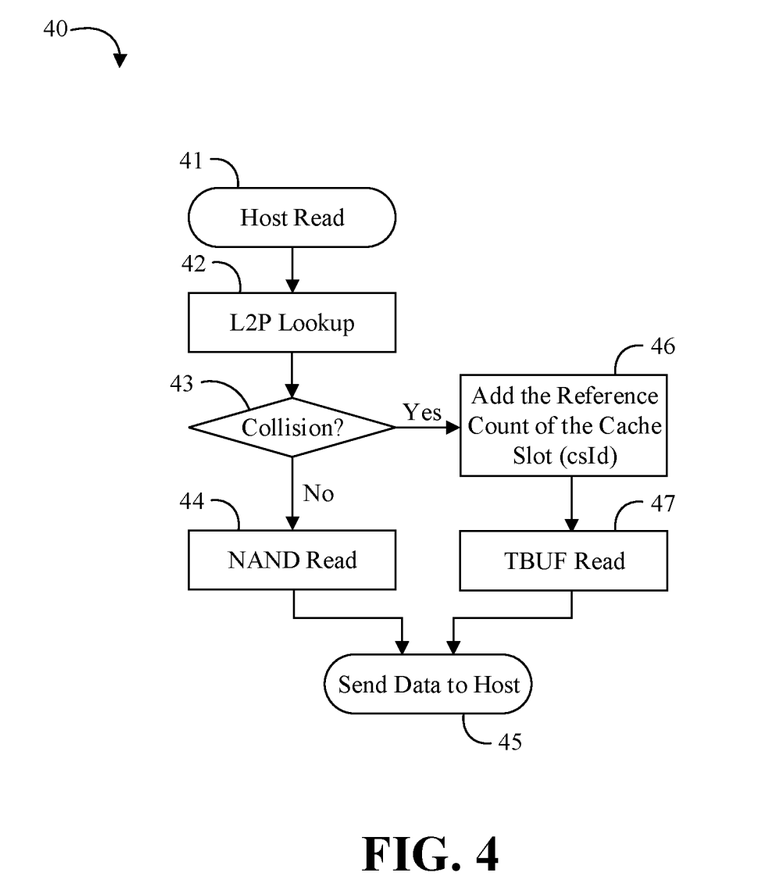
FIG. 4 is a flowchart of an example of a method of a read flow according to an embodiment.

Turning now to FIG. 4, an embodiment of a method 40 of a read flow may include receiving a host read request at block 41, performing a L2P lookup on the host read logical address at block 42, and detecting a collision at block 43 (e.g., based on the state of the exception bit in the L2P table. If no collision is detected at block 43, the method 40 may include performing a NAND read at block 44, and sending the data read from the NAND to the host at block 45. If a collision is detected at block 43, the method 40 may include adding the reference count of a cache slot identifier (csId) at block 46 (e.g., where csId comes from the L2P entry data structure), performing a TBUF read at block 47, and sending the data read from the TBUF to the host at block 45. In an embodiment of a SSD, when there is no collision, the SSD firmware reads the data from NAND. When a collision is detected, the SSD firmware will increase the reference count of the csId in the corresponding L2P table entry. Then the SSD firmware may read the data from the TBUF directly. Some embodiments may advantageously reduce SSD read latency. For example, when reading after writing the same logical block addresses (LBAs) to the SSD, the read latency may be much less than a NAND programming time, or less than a NAND read time.

Figure 5:
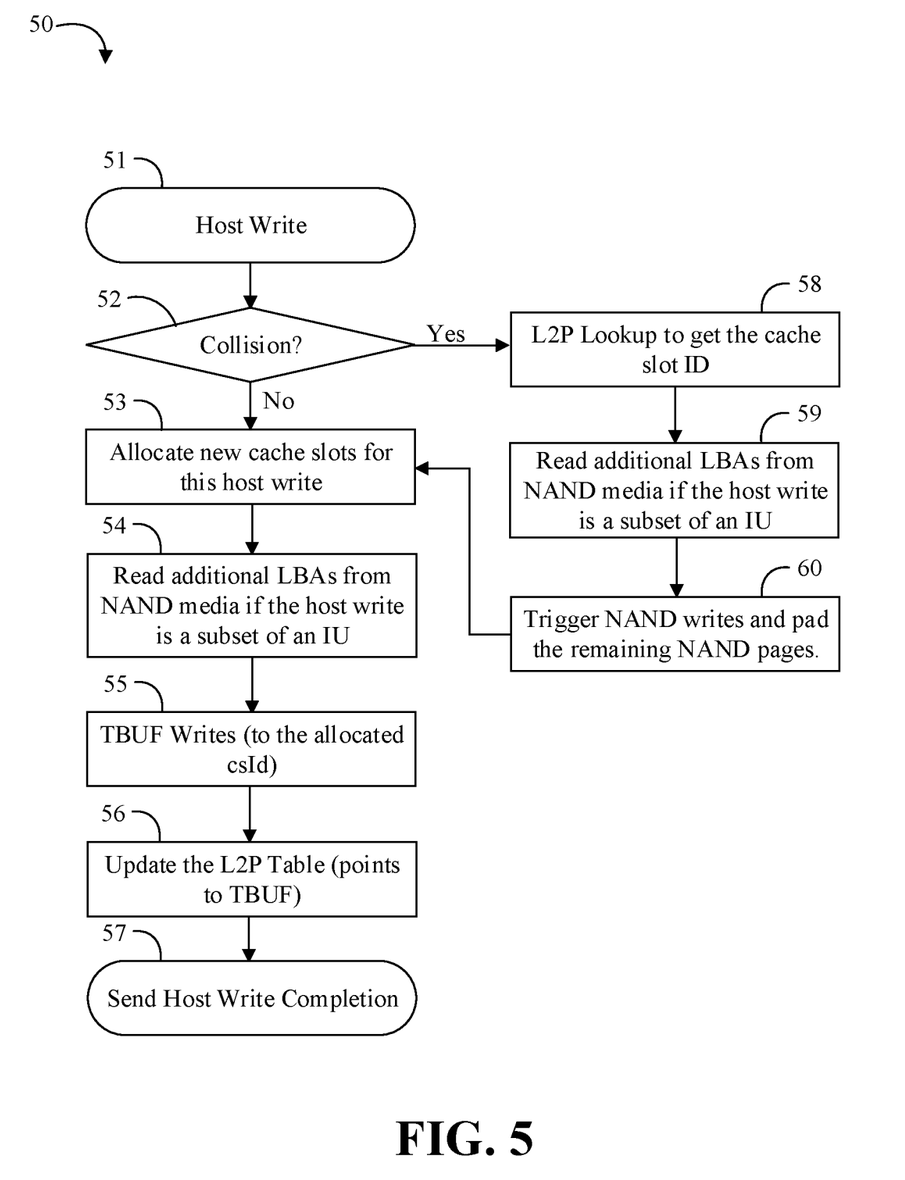
FIG. 5 is a flowchart of an example of a method of a host write flow according to an embodiment.

Turning now to FIG. 5, an embodiment of a method 50 of a host write flow may include receiving a host write request at block 51, and detecting a collision at block 52. If no collision is detected at block 52, the method 50 may include allocating new cache slots for the host write at block 53, reading additional logical block addresses (LBAs) from NAND media if the host write is a subset of an IU at block 54, and performing TBUF writes to the allocated csId(s) at block 55. The method 50 may then include updating the L2P table to point to the TBUF at block 56, and sending an indication of a write completion to the host at block 57. If a collision is detected at block 52, the method 50 may include performing a L2P lookup to get the cache slot ID at block 58, reading additional LBAs from NAND media if the host write is a subset of an IU at block 59, and triggering NAND writes and padding the remaining NAND pages at block 60. The method 50 may then proceed to block 53.

Figure 6:
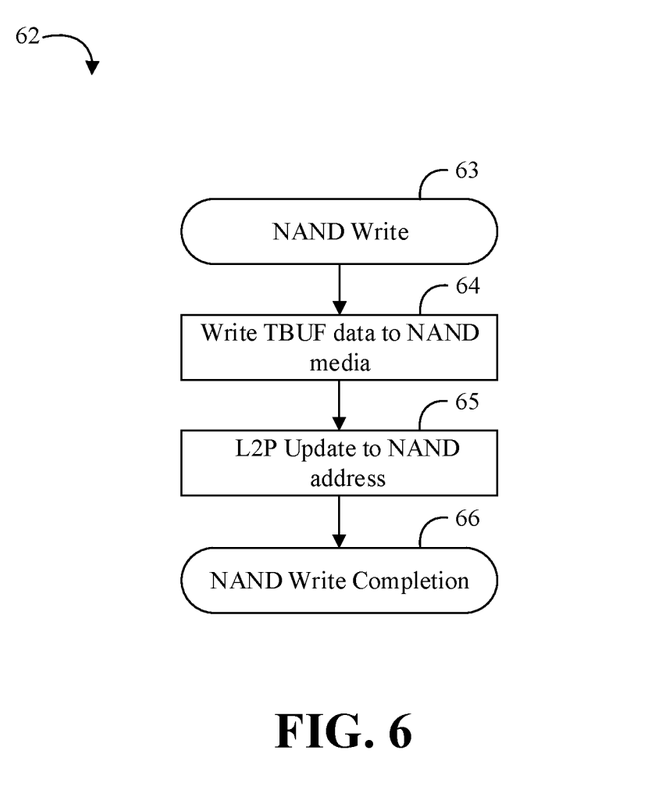
FIG. 6 is a flowchart of an example of a method of a NAND write flow according to an embodiment.

Turning now to FIG. 6, a method 62 of a NAND write flow may include receiving a NAND write request at block 63, writing TBUF data to NAND media at block 64, updating the L2P table to point to the NAND address at block 65, and sending an indication of a NAND write completion at block 66.

In some embodiments, the write flow may contain two parts. One part includes the writes from the host to the TBUF (e.g., see the method 50 (FIG. 5)). The other part includes the writes from TBUF to NAND media (e.g., see the method 62 (FIG. 6)). For each IU write, some embodiments may update the L2P entry twice. In particular, the L2P entry may be updated once for the TBUF address, and the L2P entry may be updated again for the NAND address when the data is moved from the TBUF to the NAND media. If the host write is unaligned with the IU, there will be an additional step to read the additional LBAs from NAND to the allocated cache slot. When the host writes to the same LBA, a collision will be detected. Then the SSD firmware will allocate a new cache slot and point the L2P entry to the new address after all the new data is successfully received from the host as an atomic unit.

The technology discussed herein may be utilized in various computing systems (e.g., including a non-mobile computing device such as a desktop, workstation, server, rack system, etc., a mobile computing device such as a smartphone, tablet, Ultra-Mobile Personal Computer (UMPC), laptop computer, ULTRABOOK computing device, smart watch, smart glasses, smart bracelet, etc., and/or a client/edge device such as an Internet-of-Things (IoT) device (e.g., a sensor, a camera, etc.)).

Figure 7:
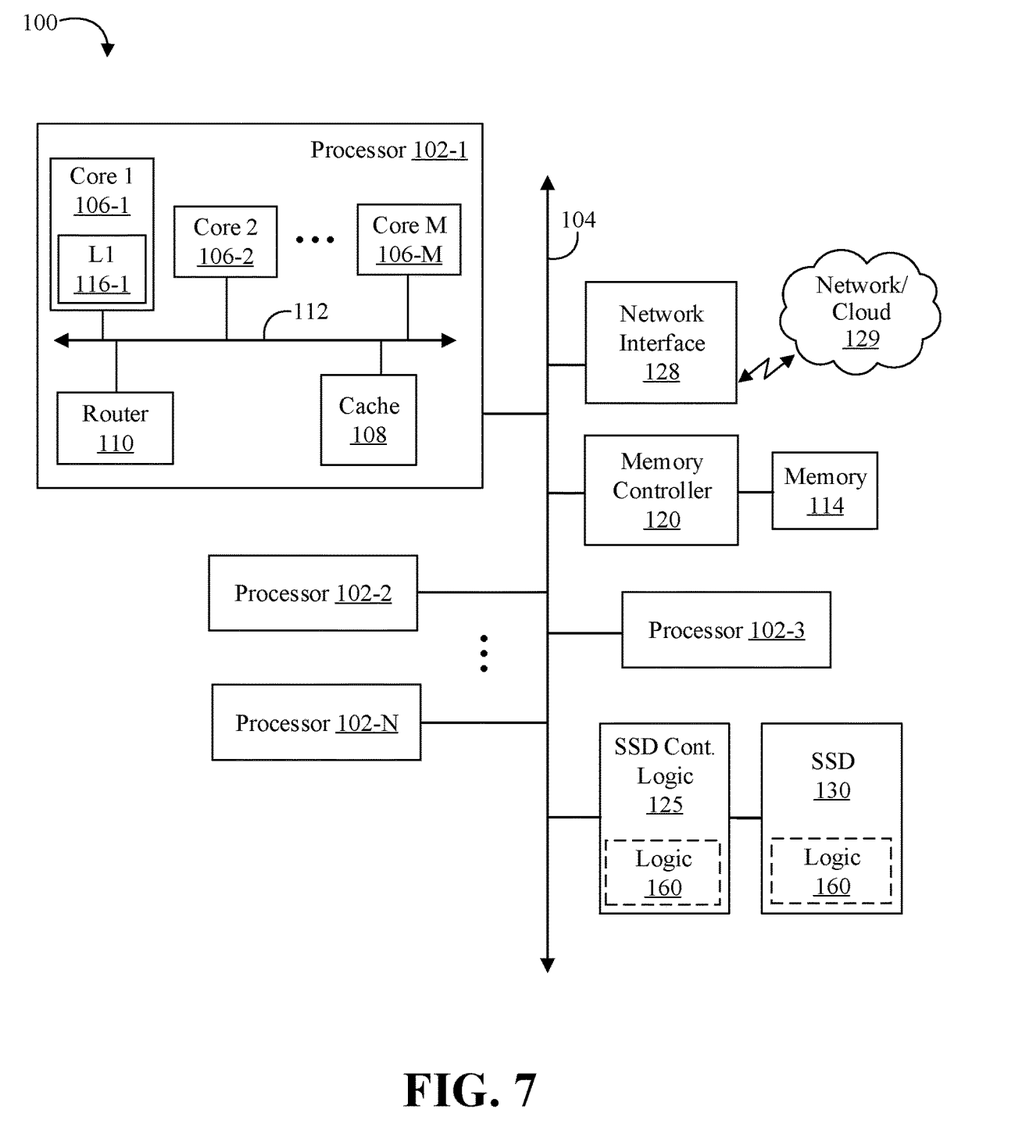
FIG. 7 is a block diagram of an example of a computing system according to an embodiment.

Turning now to FIG. 7, an embodiment of a computing system 100 may include one or more processors 102-1 through 102-N (generally referred to herein as "processors 102" or "processor 102"). The processors 102 may communicate via an interconnection or bus 104. Each processor 102 may include various components some of which are only discussed with reference to processor 102-1 for clarity. Accordingly, each of the remaining processors 102-2 through 102-N may include the same or similar components discussed with reference to the processor 102-1.

In some embodiments, the processor 102-1 may include one or more processor cores 106-1 through 106-M (referred to herein as "cores 106," or more generally as "core 106"), a cache 108 (which may be a shared cache or a private cache in various embodiments), and/or a router 110. The processor cores 106 may be implemented on a single integrated circuit (IC) chip. Moreover, the chip may include one or more shared and/or private caches (such as cache 108), buses or interconnections (such as a bus or interconnection 112), memory controllers, or other components.

In some embodiments, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that is utilized by one or more components of the processor 102-1, such as the cores 106. For example, the cache 108 may locally cache data stored in a memory 114 for faster access by the components of the processor 102. As shown in FIG. 7, the memory 114 may be in communication with the processors 102 via the interconnection 104. In some embodiments, the cache 108 (that may be shared) may have various levels, for example, the cache 108 may be a mid-level cache and/or a last-level cache (LLC). Also, each of the cores 106 may include a level 1 (L1) cache (116-1) (generally referred to herein as "L1 cache 116"). Various components of the processor 102-1 may communicate with the cache 108 directly, through a bus (e.g., the bus 112), and/or a memory controller or hub.

As shown in FIG. 7, memory 114 may be coupled to other components of system 100 through a memory controller 120. Memory 114 may include volatile memory and may be interchangeably referred to as main memory. Even though the memory controller 120 is shown to be coupled between the interconnection 104 and the memory 114, the memory controller 120 may be located elsewhere in system 100. For example, memory controller 120 or portions of it may be provided within one of the processors 102 in some embodiments.

The system 100 may communicate with other devices/systems/networks via a network interface 128 (e.g., which is in communication with a computer network and/or the cloud 129 via a wired or wireless interface). For example, the network interface 128 may include an antenna (not shown) to wirelessly (e.g., via an Institute of Electrical and Electronics Engineers (IEEE) 802.11 interface (including IEEE 802.11a/b/g/n/ac, etc.), cellular interface, 3G, 4G, LTE, BLUETOOTH, etc.) communicate with the network/cloud 129.

System 100 may also include Non-Volatile (NV) storage device such as a SSD 130 coupled to the interconnect 104 via SSD controller logic 125. Hence, logic 125 may control access by various components of system 100 to the SSD 130. Furthermore, even though logic 125 is shown to be directly coupled to the interconnection 104 in FIG. 7, logic 125 can alternatively communicate via a storage bus/interconnect (such as the SATA (Serial Advanced Technology Attachment) bus, Peripheral Component Interconnect (PCI) (or PCI EXPRESS (PCIe) interface), NVM EXPRESS (NVMe), etc.) with one or more other components of system 100 (for example where the storage bus is coupled to interconnect 104 via some other logic like a bus bridge, chipset, etc. Additionally, logic 125 may be incorporated into memory controller logic (such as those discussed with reference to FIG. 8) or provided on a same integrated circuit (IC) device in various embodiments (e.g., on the same IC device as the SSD 130 or in the same enclosure as the SSD 130).

Furthermore, logic 125 and/or SSD 130 may be coupled to one or more sensors (not shown) to receive information (e.g., in the form of one or more bits or signals) to indicate the status of or values detected by the one or more sensors. These sensor(s) may be provided proximate to components of system 100 (or other computing systems discussed herein), including the cores 106, interconnections 104 or 112, components outside of the processor 102, SSD 130, SSD bus, SATA bus, logic 125, logic 160, etc., to sense variations in various factors affecting power/thermal behavior of the system/platform, such as temperature, operating frequency, operating voltage, power consumption, and/or inter-core communication activity, etc.

As illustrated in FIG. 7, SSD 130 may include logic 160, which may be in the same enclosure as the SSD 130 and/or fully integrated on a printed circuit board (PCB) of the SSD 130. Advantageously, the logic 160 may include technology to implement one or more aspects of the method 25 (FIGS. 3A to 3C), the method 40 (FIG. 4), the method 50 (FIG. 5), the method 62 (FIG. 6). For example, the logic 160 may include technology to detect a collision for a host read request of the SSD 130, and read data for the host read request directly from a transfer buffer if the collision is detected. For example, the logic 160 may be configured to detect the collision based on an exception bit in a L2P table entry which corresponds to the host read request. The logic 160 may also be configured to determine an address to read from the transfer buffer based on the L2P table entry if the exception bit is set to represent an exception condition. In some embodiments, the logic 160 may be further configured to increase a reference count for a cache slot indicated in the L2P table entry. The logic 160 may also be configured to detect an exception condition for a host write request of an electronic storage device, write data for the host write request to a write address of the transfer buffer, set an exception bit in a L2P table entry which corresponds to the write request to indicate the exception condition, and update the L2P table entry to point to the write address of the transfer buffer. The logic 160 may be further configured to write data from the transfer buffer to a write address of NAND media of the SSD 130, set an exception bit in a L2P table entry which corresponds to the data to indicate a non-exception condition, and update the L2P table entry to point to the write address of the NAND media.

In other embodiments, the SSD 130 may be replaced with any suitable persistent storage technology/media. In some embodiments, the logic 160 may be coupled to one or more substrates (e.g., silicon, sapphire, gallium arsenide, printed circuit board (PCB), etc.), and may include transistor channel regions that are positioned within the one or more substrates. In other embodiments, the SSD 130 may include two or more types of persistent storage media and may be considered a hybrid SSD. For example, the bulk of the storage may be NAND and the SSD may further include some faster, smaller granularity accessible (e.g., byte-addressable) NVM such as INTEL 3DXP media (e.g., which may be utilized to implement the transfer buffer). The SSD 130 may alternatively, or additionally, include persistent volatile memory (e.g., battery or capacitor backed-up DRAM or SRAM). For example, some SSDs may include POWER LOSS IMMINENT (PLI) technology with energy storing capacitors. The energy storing capacitors may provide enough energy (power) to complete any commands in progress and to make sure that any data in the DRAMs/SRAMs is committed to the non-volatile NAND media. The capacitors may act as backup batteries for the SSD. As shown in FIG. 7, features or aspects of the logic 160 may be distributed throughout the SSD 130, and/or co-located/integrated with various components of the SSD 130.

Figure 8:
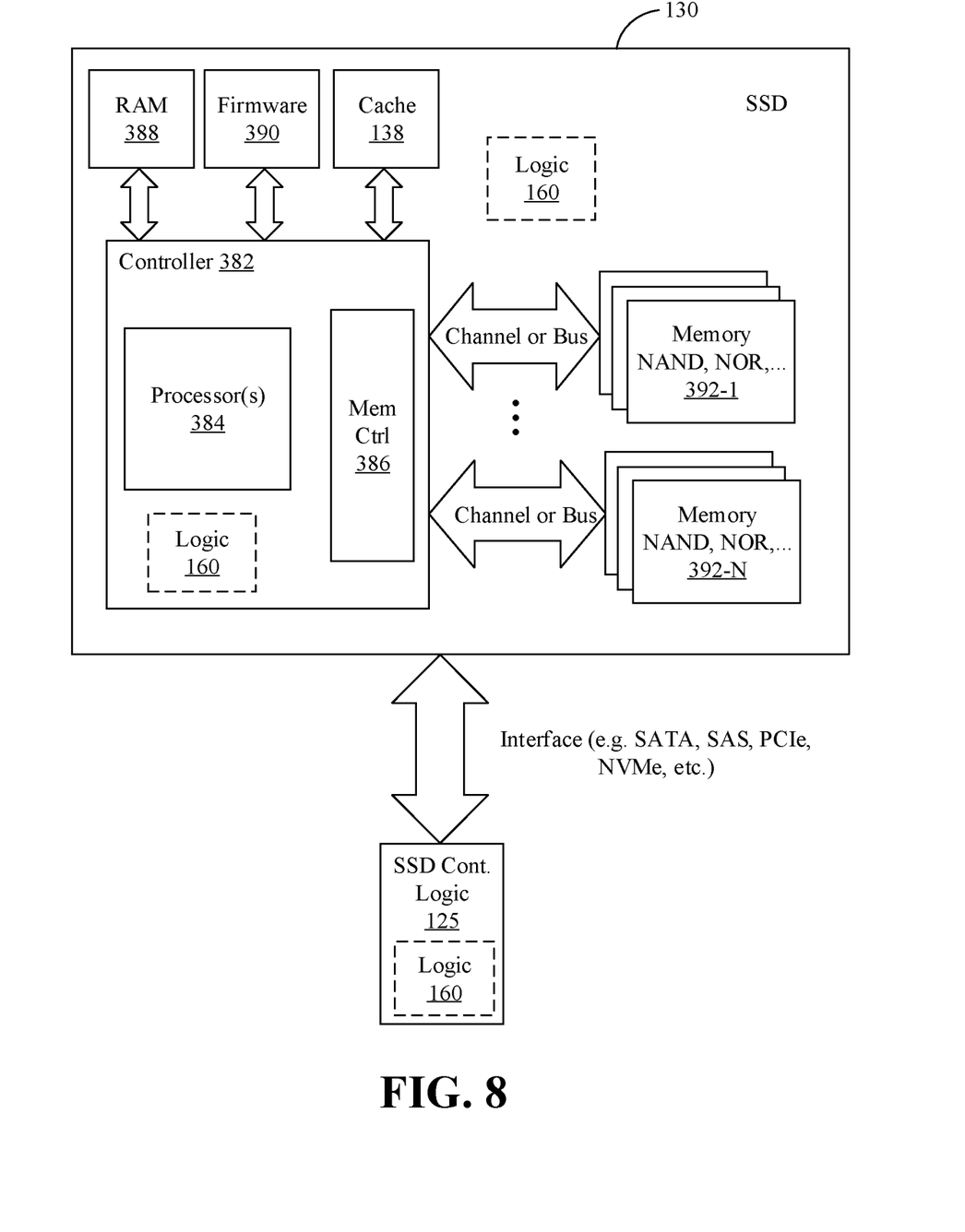
FIG. 8 is a block diagram of an example of a SSD according to an embodiment.

FIG. 8 illustrates a block diagram of various components of the SSD 130, according to an embodiment. As illustrated in FIG. 8, logic 160 may be located in various locations such as inside the SSD 130 or controller 382, etc., and may include similar technology as discussed in connection with FIG. 7. SSD 130 includes a controller 382 (which in turn includes one or more processor cores or processors 384 and memory controller logic 386), cache 138, RAM 388 (e.g., DRAM, SRAM, NV RAM, PCM, battery backed-up or imminent power loss (IPL) backed-up DRAM or SRAM, etc.), firmware storage 390, and one or more memory modules or dies 392-1 to 392-N (which may include NAND flash, NOR flash, or other types of non-volatile memory). For example, one or both of the cache 138 and the RAM 388 may be utilized to implement a transfer buffer as described herein. Memory modules 392-1 to 392-N are coupled to the memory controller logic 386 via one or more memory channels or busses. Also, SSD 130 communicates with logic 125 via an interface (such as a SATA, SAS, PCIe, NVMe, etc., interface). One or more of the features/aspects/operations discussed with reference to FIGS. 1-6 may be performed by one or more of the components of FIG. 8. Processors 384 and/or controller 382 may compress/decompress (or otherwise cause compression/decompression of) data written to or read from memory modules 392-1 to 392-N. Also, one or more of the features/aspects/operations of FIGS. 1-6 may be programmed into the firmware 390. Further, SSD controller logic 125 may also include logic 160.

Additional Notes and Examples

Example 1 includes a semiconductor apparatus for use with an electronic storage device, comprising one or more substrates, and logic coupled to the one or more substrates, wherein the logic is at least partly implemented in one or more of configurable logic and fixed-functionality hardware logic, the logic coupled to the one or more substrates to detect a collision for a read request of an electronic storage device, and read data for the read request directly from a transfer buffer if the collision is detected.

Example 2 includes the apparatus of Example 1, wherein the logic is further to detect the collision based on an exception flag in a logical-to-physical table entry which corresponds to the read request.

Example 3 includes the apparatus of Example 2, wherein the logic is further to determine an address to read from the transfer buffer based on the logical-to-physical table entry if the exception flag is set to represent an exception condition.

Example 4 includes the apparatus of any of Examples 2 to 3, wherein the logic is further to increase a reference count for a cache slot indicated in the logical-to-physical table entry.

Example 5 includes the apparatus of any of Examples 1 to 4, wherein the logic is further to detect an exception condition for a write request of an electronic storage device, write data for the write request to a write address of the transfer buffer, set an exception flag in a logical-to-physical table entry which corresponds to the write request to indicate the exception condition, and update the logical-to-physical table entry to point to the write address of the transfer buffer.

Example 6 includes the apparatus of any of Examples 1 to 5, wherein the electronic storage device comprises NAND media.

Example 7 includes the apparatus of any of Examples 1 to 6, wherein the logic coupled to the one or more substrates includes transistor channel regions that are positioned within the one or more substrates.

Example 8 includes an electronic storage system, comprising a persistent storage media, a transfer buffer, and a controller communicatively coupled to the persistent storage media and the transfer buffer, the controller including logic to detect a collision for a read request, and read data for the read request directly from the transfer buffer if the collision is detected.

Example 9 includes the system of Example 8, wherein the logic is further to detect the collision based on an exception flag in a logical-to-physical table entry which corresponds to the read request.

Example 10 includes the system of Example 9, wherein the logic is further to determine an address to read from the transfer buffer based on the logical-to-physical table entry if the exception flag is set to represent an exception condition.

Example 11 includes the system of any of Examples 9 to 10, wherein the logic is further to increase a reference count for a cache slot indicated in the logical-to-physical table entry.

Example 12 includes the system of any of Examples 8 to 11, wherein the logic is further to detect an exception condition for a write request, write data for the write request to a write address of the transfer buffer, set an exception flag in a logical-to-physical table entry which corresponds to the write request to indicate the exception condition, and update the logical-to-physical table entry to point to the write address of the transfer buffer.

Example 13 includes the system of any of Examples 8 to 12, wherein the persistent storage media comprises NAND media, and/or wherein the transfer buffer is located inside the controller.

Example 14 includes a method of controlling storage, comprising detecting a collision for a read request of an electronic storage device, and reading data for the read request directly from a transfer buffer if the collision is detected.

Example 15 includes the method of Example 14, further comprising detecting the collision based on an exception flag in a logical-to-physical table entry which corresponds to the read request.

Example 16 includes the method of Example 15, further comprising determining an address to read from the transfer buffer based on the logical-to-physical table entry if the exception flag is set to represent an exception condition.

Example 17 includes the method of any of Examples 15 to 16, further comprising increasing a reference count for a cache slot indicated in the logical-to-physical table entry.

Example 18 includes the method of any of Examples 14 to 17, further comprising detecting an exception condition for a write request of an electronic storage device, writing data for the write request to a write address of the transfer buffer, setting an exception flag in a logical-to-physical table entry which corresponds to the write request to indicate the exception condition, and updating the logical-to-physical table entry to point to the write address of the transfer buffer.

Example 19 includes the method of any of Examples 14 to 18, further comprising writing data from the transfer buffer to a write address of NAND media of the electronic storage device, setting an exception flag in a logical-to-physical table entry which corresponds to the data to indicate a non-exception condition, and updating the logical-to-physical table entry to point to the write address of the NAND media.

Example 20 includes the method of any of Examples 14 to 19, wherein the electronic storage device comprises a solid state drive.

Example 21 includes at least one computer readable storage medium, comprising a set of instructions, which when executed by a computing device, cause the computing device to detect a collision for a read request of an electronic storage device, and read data for the read request directly from a transfer buffer if the collision is detected.

Example 22 includes the at least one computer readable storage medium of Example 21, comprising a further set of instructions, which when executed by the computing device, cause the computing device to detect the collision based on an exception flag in a logical-to-physical table entry which corresponds to the read request.

Example 23 includes the at least one computer readable storage medium of Example 22, comprising a further set of instructions, which when executed by the computing device, cause the computing device to determine an address to read from the transfer buffer based on the logical-to-physical table entry if the exception flag is set to represent an exception condition.

Example 24 includes the at least one computer readable storage medium of any of Examples 22 to 23, comprising a further set of instructions, which when executed by the computing device, cause the computing device to increase a reference count for a cache slot indicated in the logical-to-physical table entry.

Example 25 includes the at least one computer readable storage medium of any of Examples 21 to 24, comprising a further set of instructions, which when executed by the computing device, cause the computing device to detect an exception condition for a write request of an electronic storage device, write data for the write request to a write address of the transfer buffer, set an exception flag in a logical-to-physical table entry which corresponds to the write request to indicate the exception condition, and update the logical-to-physical table entry to point to the write address of the transfer buffer.

Example 26 includes the at least one computer readable storage medium of any of Examples 21 to 25, comprising a further set of instructions, which when executed by the computing device, cause the computing device to write data from the transfer buffer to a write address of NAND media of the electronic storage device, set an exception flag in a logical-to-physical table entry which corresponds to the data to indicate a non-exception condition, and update the logical-to-physical table entry to point to the write address of the NAND media.

Example 27 includes the at least one computer readable medium storage medium of any of Examples 21 to 26, wherein the electronic storage device comprises a solid state drive.

Example 28 includes a storage controller apparatus, comprising means for detecting a collision for a read request of an electronic storage device, and means for reading data for the read request directly from a transfer buffer if the collision is detected.

Example 29 includes the apparatus of Example 28, further comprising means for detecting the collision based on an exception flag in a logical-to-physical table entry which corresponds to the read request.

Example 30 includes the apparatus of Example 29, further comprising means for determining an address to read from the transfer buffer based on the logical-to-physical table entry if the exception flag is set to represent an exception condition.

Example 31 includes the apparatus of any of Examples 29 to 30, further comprising means for increasing a reference count for a cache slot indicated in the logical-to-physical table entry.

Example 32 includes the apparatus of any of Examples 28 to 31, further comprising means for detecting an exception condition for a write request of an electronic storage device, means for writing data for the write request to a write address of the transfer buffer, means for setting an exception flag in a logical-to-physical table entry which corresponds to the write request to indicate the exception condition, and means for updating the logical-to-physical table entry to point to the write address of the transfer buffer.

Example 33 includes the apparatus of any of Examples 28 to 32, further comprising means for writing data from the transfer buffer to a write address of NAND media of the electronic storage device, means for setting an exception flag in a logical-to-physical table entry which corresponds to the data to indicate a non-exception condition, and means for updating the logical-to-physical table entry to point to the write address of the NAND media.

Example 34 includes the apparatus of any of Examples 28 to 33, wherein the electronic storage device comprises a solid state drive.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A semiconductor apparatus for use with an electronic storage device, comprising:
   one or more substrates; and
   logic coupled to the one or more substrates, wherein the logic is at least partly implemented in one or more of configurable logic and fixed-functionality hardware logic, the logic coupled to the one or more substrates to:
   detect a collision for a read request of an electronic storage device, wherein the detection of the collision is based on an exception flag in a logical-to-physical table entry which corresponds to the read request, and
   read data for the read request directly from a transfer buffer if the collision is detected.

2. The apparatus of claim 1, wherein the logic is further to:
   determine an address to read from the transfer buffer based on the logical-to-physical table entry if the exception flag is set to represent an exception condition.

3. The apparatus of claim 1, wherein the logic is further to:
   increase a reference count for a cache slot indicated in the logical-to-physical table entry.

4. The apparatus of claim 1, wherein the logic is further to:
   detect an exception condition for a write request of an electronic storage device;
   write data for the write request to a write address of the transfer buffer;
   set an exception flag in a logical-to-physical table entry which corresponds to the write request to indicate the exception condition; and
   update the logical-to-physical table entry to point to the write address of the transfer buffer.

5. The apparatus of claim 1, wherein the electronic storage device comprises NAND media.

6. The apparatus of claim 1, wherein the logic coupled to the one or more substrates includes transistor channel regions that are positioned within the one or more substrates.

7. An electronic storage system, comprising:
   a persistent storage media;
   a transfer buffer; and
   a controller communicatively coupled to the persistent storage media and the transfer buffer, the controller including logic to:
   detect a collision for a read request, wherein the detection of the collision is based on an exception flag in a logical-to-physical table entry which corresponds to the read request, and
   read data for the read request directly from the transfer buffer if the collision is detected.

8. The system of claim 7, wherein the logic is further to:
   determine an address to read from the transfer buffer based on the logical-to-physical table entry if the exception flag is set to represent an exception condition.

9. The system of claim 7, wherein the logic is further to:
   increase a reference count for a cache slot indicated in the logical-to-physical table entry.

10. The system of claim 7, wherein the logic is further to:
    detect an exception condition for a write request;
    write data for the write request to a write address of the transfer buffer;
    set an exception flag in a logical-to-physical table entry which corresponds to the write request to indicate the exception condition; and
    update the logical-to-physical table entry to point to the write address of the transfer buffer.

11. The system of claim 7, wherein the transfer buffer is located inside the controller.

12. A method of controlling storage, comprising:
    detecting a collision for a read request of an electronic storage device, wherein the detection of the collision is based on an exception flag in a logical-to-physical table entry which corresponds to the read request; and
    reading data for the read request directly from a transfer buffer if the collision is detected.

13. The method of claim 12, further comprising:
    determining an address to read from the transfer buffer based on the logical-to-physical table entry if the exception flag is set to represent an exception condition.

14. The method of claim 12, further comprising:
    increasing a reference count for a cache slot indicated in the logical-to-physical table entry.

15. The method of claim 12, further comprising:
    detecting an exception condition for a write request of an electronic storage device;
    writing data for the write request to a write address of the transfer buffer;
    setting an exception flag in a logical-to-physical table entry which corresponds to the write request to indicate the exception condition; and
    updating the logical-to-physical table entry to point to the write address of the transfer buffer.

16. The method of claim 12, further comprising:
    writing data from the transfer buffer to a write address of NAND media of the electronic storage device;
    setting an exception flag in a logical-to-physical table entry which corresponds to the data to indicate a non-exception condition; and
    updating the logical-to-physical table entry to point to the write address of the NAND media.

17. The method of claim 12, wherein the electronic storage device comprises a solid state drive.

* * * * *